March 15, 1938. D. L. NEWTON 2,111,031
GAS SAVER
Filed Aug. 10, 1937
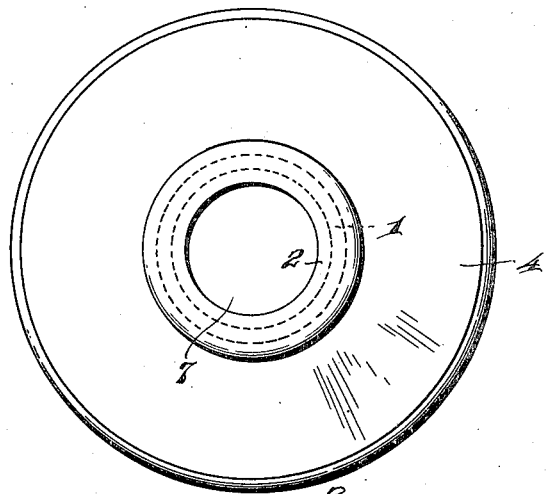
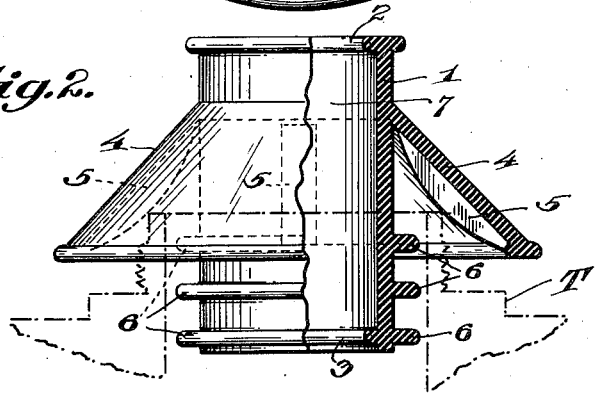
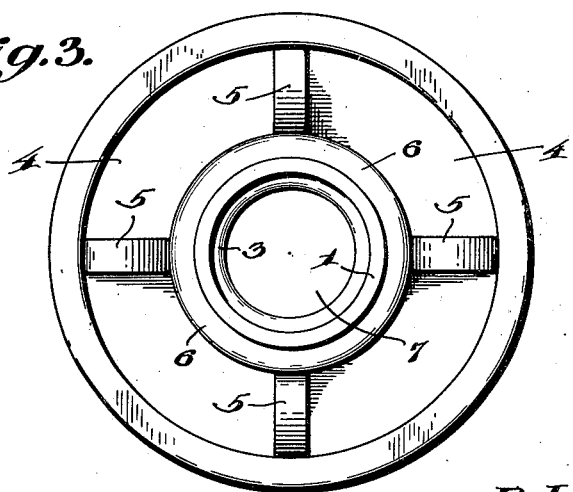
INVENTOR.
D. L. NEWTON.
BY Lester L Sargent
ATTORNEY.

Patented Mar. 15, 1938

2,111,031

UNITED STATES PATENT OFFICE 2,111,031

GAS SAVER

Dennis Lee Newton, Fort Madison, Iowa

Application August 10, 1937, Serial No. 158,445

4 Claims. (Cl. 221—84)

The object of my invention is to provide a novel and useful device adapted to fit on the nozzle of a hose of a gasoline filling tank and which will effectively cover the opening in the tank so that nothing but gasoline will enter while filling the tank, and which will also lessen fire hazard, prevent evaporation of the gasoline (or whatever fuel may be used), and prevent gasoline from splashing over the car when the tank is full and runs over.

I attain these and other objects of my invention by the device illustrated in the accompanying drawing, in which—

Figure 1 is a top plan view of the invention;

Fig. 2 is a view partly in side elevation and partly in vertical section of the device applied to the gasoline tank of a motor vehicle; and Fig. 3 is a bottom plan view of the invention.

Like numerals indicate like parts in each of the views.

Referring to the accompanying drawing, I provide a rubber cylinder 1 of suitable size to be inserted in the neck or inlet pipe T of the gasoline (or fuel) tank of a motor vehicle. This cylinder 1 has an annular internal top flange 2 and an annular internal bottom flange 3, which adapts itself to the nozzle; it also has a conical or bell-shaped flange or roof 4 which in turn is provided with a series of spaced ribs 5, preferably four altogether, shaped as shown in Fig. 2, to prevent the roof 4 from sealing the inlet against the escape of air from the gasoline tank when it is being filled with gasoline. The lower portion of the cylinder 1 is provided with a series of spaced external annular flanges 6 which allow the air to escape also preventing splashing and waste of gasoline while filling the tank.

The device is preferably made of rubber, synthetic rubber of other suitable and preferably resilient composition.

The device is applied to the hose discharge nozzle of a gasoline filling tank and when used is applied over the inlet neck T of the gasoline tank of a motor vehicle, as illustrated in Fig. 2 of the drawing. The roof 4 extends over the rim of the inlet neck of a gasoline tank and prevents rain, snow, sleet, dirt or anything but gasoline from entering the tank while filling. The ribs support the roof in a spaced relation to the rim of the inlet pipe so as not to interfere with the necessary escape of air while the tank is being filled. The annular inside flanges 2 and 3 act as a gasket or bushing and snugly fit the straight or flexible nozzle on the hose leading from the gasoline filling tank. While the device is designed to fit tightly on the nozzle of the filling hose, it can be easily removed if desired.

What I claim is:

1. A device adapted to be applied to the nozzle of a filling hose of a gasoline filling tank comprising a cylindrical tube having annular internal flanges at the top and bottom of the tube and having a conical roof member integral with the tube and adapted to fit over the neck of a motor vehicle fuel tank, and means of spacing roof member from the rim of the inlet neck of a motor vehicle fuel tank to which the device is applied.

2. In a device of the type described, the combination of a cylindrical rubber tube having annular internal flanges to snugly engage the nozzle of the discharge hose of a fuel tank, a conical roof member integral with the aforesaid rubber tube, said roof member having ribs for spacing the said roof member from the rim of the inlet neck or tube of a fuel tank to permit escape of air while it is being filled.

3. In combination with a device defined in claim 1, the aforesaid tube having a series of spaced external annular flanges to prevent splashing and the escape of gasoline while filling the tank.

4. In combination with the device defined in claim 2, the aforesaid rubber tube having spaced external annular flanges to prevent splashing and the escape of gas and gasoline.

DENNIS LEE NEWTON.